US008659253B2

(12) United States Patent
Satou et al.

(10) Patent No.: US 8,659,253 B2
(45) Date of Patent: Feb. 25, 2014

(54) ELECTRIC POWER STEERING DEVICE

(75) Inventors: Takafumi Satou, Okazaki (JP);
Nobuhiko Uryu, Kariya (JP); Yasuhiko Mukai, Kariya (JP)

(73) Assignee: Denso Corporation, Kariya (JP)

( * ) Notice: Subject to any disclaimer, the term of this patent is extended or adjusted under 35 U.S.C. 154(b) by 506 days.

(21) Appl. No.: 12/977,449

(22) Filed: Dec. 23, 2010

(65) Prior Publication Data
US 2011/0156629 A1    Jun. 30, 2011

(30) Foreign Application Priority Data

Dec. 25, 2009    (JP) ................................. 2009-295533

(51) Int. Cl.
*G05B 5/00*    (2006.01)
*H02H 7/08*    (2006.01)
*H02P 1/04*    (2006.01)

(52) U.S. Cl.
USPC ...... 318/453; 318/139; 318/432; 318/400.21; 318/400.22

(58) Field of Classification Search
USPC .............. 318/453, 139, 400.02, 432, 400.21, 318/400.22
See application file for complete search history.

(56) References Cited

U.S. PATENT DOCUMENTS

| | | | | |
|---|---|---|---|---|
| 5,414,339 | A | * | 5/1995 | Masaki et al. ............... 318/800 |
| 5,969,919 | A | | 10/1999 | Kobayashi et al. |
| 6,158,553 | A | * | 12/2000 | Oshima et al. ............... 187/293 |
| 6,929,090 | B2 | | 8/2005 | Furumi et al. |
| 6,971,473 | B2 | | 12/2005 | Furumi et al. |
| 7,014,008 | B2 | | 3/2006 | Furumi et al. |
| 7,439,697 | B2 | * | 10/2008 | Miyazaki et al. ........ 318/400.41 |
| 2010/0017063 | A1 | * | 1/2010 | Maeda ............................ 701/42 |
| 2010/0186491 | A1 | * | 7/2010 | Shibata et al. ............. 73/114.72 |
| 2011/0054742 | A1 | | 3/2011 | Yamashita |

FOREIGN PATENT DOCUMENTS

| | | |
|---|---|---|
| JP | A-H05-103497 | 4/1993 |
| JP | A-H05-168292 | 6/1996 |
| JP | P2003-40123 A | 2/2003 |
| JP | 2005-304119 | 10/2005 |
| JP | A-2008-99394 | 4/2008 |

OTHER PUBLICATIONS

Japanese Office Action dated Dec. 6, 2011, issued in corresponding Japanese Application No. 2009295533 with English Translation.
Office Action (2 pages) dated Feb. 8, 2013, issued in corresponding Japanese Application No. 2009-295533 and English translation (3 pages).

(Continued)

*Primary Examiner* — Erick Glass
(74) *Attorney, Agent, or Firm* — Nixon & Vanderhye PC

(57) ABSTRACT

An electric power steering device includes: an electric power source for supplying first current; a controller for setting a current instruction value; multiple electric power converters for converting the first current to second current corresponding to the current instruction value; multiple pairs of windings for generating a driving force of a motor; and a failure detection element for detecting failure of the electric power converters and the windings. The controller reduces the current instruction value to be equal to or smaller than a predetermined instruction value of a normal operation when the failure detection element detects the failure. The controller controls the electric power converter in a normal state to supply the second current to a corresponding winding.

7 Claims, 9 Drawing Sheets

(56) References Cited

OTHER PUBLICATIONS

Japanese Office Action dated Aug. 24, 2012, issued in corresponding Japanese Application No. 2009-295533 with English Translation.

Office Action (2 pages) dated Apr. 19, 2013, issued in corresponding Japanese Application No. 2009-295533 and English translation (3 pages).

* cited by examiner

ELECTRIC POWER STEERING DEVICE

CROSS REFERENCE TO RELATED APPLICATION

This application is based on Japanese Patent Application No. 2009-295533 filed on Dec. 25, 2009, the disclosure of which is incorporated herein by reference.

FIELD OF THE INVENTION

The present invention relates to an electronic power steering device for driving an electronic motor with a driving circuit having multi-system.

BACKGROUND OF THE INVENTION

Conventionally, an electronic power steering device for assisting a steering force of a driver with using a driving force of an electronic motor is well known. The steering device includes various fail-safe functions.

JP-A-2005-304119 teaches that the electronic motor includes multiple three-phase windings. An inverter for supplying current to the windings corresponds to the windings in each set. When a certain inverter or a certain windings in one set is broken, an open/close element stops supplying current from a broken inverter to corresponding windings. Thus, only a normal inverter supplies current to corresponding windings.

In JP-A-2005-304119, one set of the windings includes multiple windings in each phase. Multiple windings in one phase are arranged to have structurally the same direction of a phase difference in a circumferential direction. Thus, when a magnetic flux distribution provided by an arrangement of the windings is appropriately presented so that electro-magnetic attractive force generated between a stator and a rotor in a radial direction is cancelled, the electronic motor is stably operated even when only the normal inverter drives the motor.

Further, in JP-A-2009-6963, which corresponds to US 2010/0017063, the electronic motor includes one set of windings. One inverter supplies current to the three-phase windings. A relay is arranged between the inverter and the windings. The relay cuts the current to a certain phase winding independently.

When the inverter or the windings is broken, a broken phase winding or a broken phase element in the inverter is specified by a failure detector. The current flowing through the broken phase winding or element is cut by the relay. Then, only two phase windings or elements, which are normal, drives the motor.

In JP-A-2005-304119, when an inverter or three-phase windings in one set is broken, and only inverter and three-phase windings in another set, which are not broken, drive the motor, it is preferable to double the current to be supplied from the inverter to the windings. In this case, the magnetic flux generated in the stator is almost the same as normal operation. Accordingly, the driving force of the motor after failure is substantially equal to that before failure. However, when the driving force of the motor is maintained after failure, the driver does not feel strangeness of operation of the steering wheel. Thus, the driver is not aware of the failure of the power steering device.

Further, when the current to be supplied from the inverter to the three-phase windings is doubled after the failure, it is necessary to increase heat resistance of a semiconductor element and an electronic element, which are mounted on the motor. Accordingly, this means to increase a manufacturing cost of the semiconductor element and the electronic element although the cost is reduced because of multi-system of the driving circuit in the motor.

In JP-A-2005-304119, the relay for cutting current is arranged between each phase element of the inverter and a corresponding phase of the windings. When the relay is formed in the electronic power steering device for driving the motor with using a N-system driving circuit, the number of relays to be necessary is three multiplied by N. Accordingly, the number of parts in the power steering device increases, and the manufacturing cost increases.

Further, when the inverter or the windings is broken, the motor is driven by two-phase windings, which are normal. Thus, the electro-magnetic attractive force is inhomogeneous, so that the motor may vibrate. The vibration of the power steering device conducts the steering wheel, which is operated by the driver. Thus, the driver may feel anxiety.

SUMMARY OF THE INVENTION

In view of the above-described problem, it is an object of the present disclosure to provide an electronic power steering device for assisting a steering force of a driver safety and continuously.

According to an aspect of the present disclosure, an electric power steering device for assisting a steering force of a driver of a vehicle with a driving force of a motor includes: an electric power source for supplying first current; a controller for setting a current instruction value, which provides the driving force of the motor; a plurality of electric power converters for converting the first current from the electric power source to second current corresponding to the current instruction value; a plurality of pairs of windings, each of which correspond to a respective electric power converter, and generates the driving force of the motor when the second current is supplied from the electric power converter to the winding; and a failure detection element for detecting the first current flowing through the electric power converters and the second current flowing through the windings, and for detecting failure of the electric power converters and the windings. The controller reduces the current instruction value to be equal to or smaller than a predetermined instruction value of a normal operation when the failure detection element detects the failure. The controller controls the electric power converter in a normal state to supply the second current to a corresponding winding in the normal state.

Since the second current to be supplied from the electric power converter to the corresponding winding is reduced when the failure detection element detects the failure of the electric power converter or the winding, the driving force of the motor is reduced. Accordingly, the steering force of the driver is changed, so that the driver is aware of occurrence of the failure. Thus, the steering device can assist the steering force of the driver safety and continuously even if the electric power converter or the winding is failed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

An electronic power steering device 1 according to a first embodiment is shown in FIGS. 1 to 4.

Figure 2:
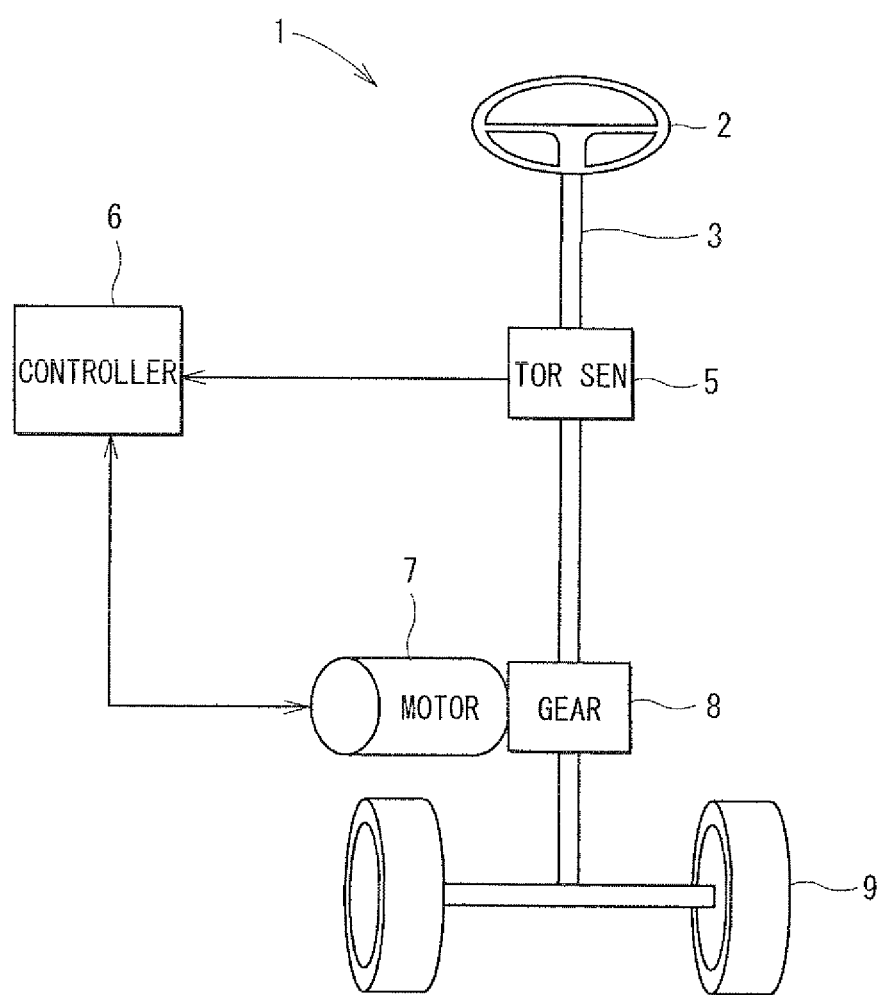
FIG. 2 is a diagram showing a construction of the power steering device.

A construction of the power steering device 1 is shown in FIG. 2. A steering shaft 3 is coupled with a steering wheel 2, which is operated by a driver of a vehicle. A torque sensor 5 detects a steering torque, which is applied to the steering shaft 3.

A controller 6 for controlling an electronic motor as a control means determines a rotation direction and a driving force of an electronic motor 7 based on a steering torque signal output from the torque sensor 5, a rotational position detection signal of the motor 7, and a vehicle speed signal transmitted via a CAN (controller area network) communication system. Further, the controller 6 sets a current setting instruction signal for outputting the determined rotation direction and the determined driving force.

When the current corresponding to the current setting instruction signal set by the controller 6 is supplied from an electric power converter to the motor 7, the motor 7 rotates and drives. The driving force of the motor 7 is transmitted to the steering shaft 3 via a gear 8, so that the steering force of the driver is assisted. Thus, the driver easily operates a wheel 9.

Figure 1:
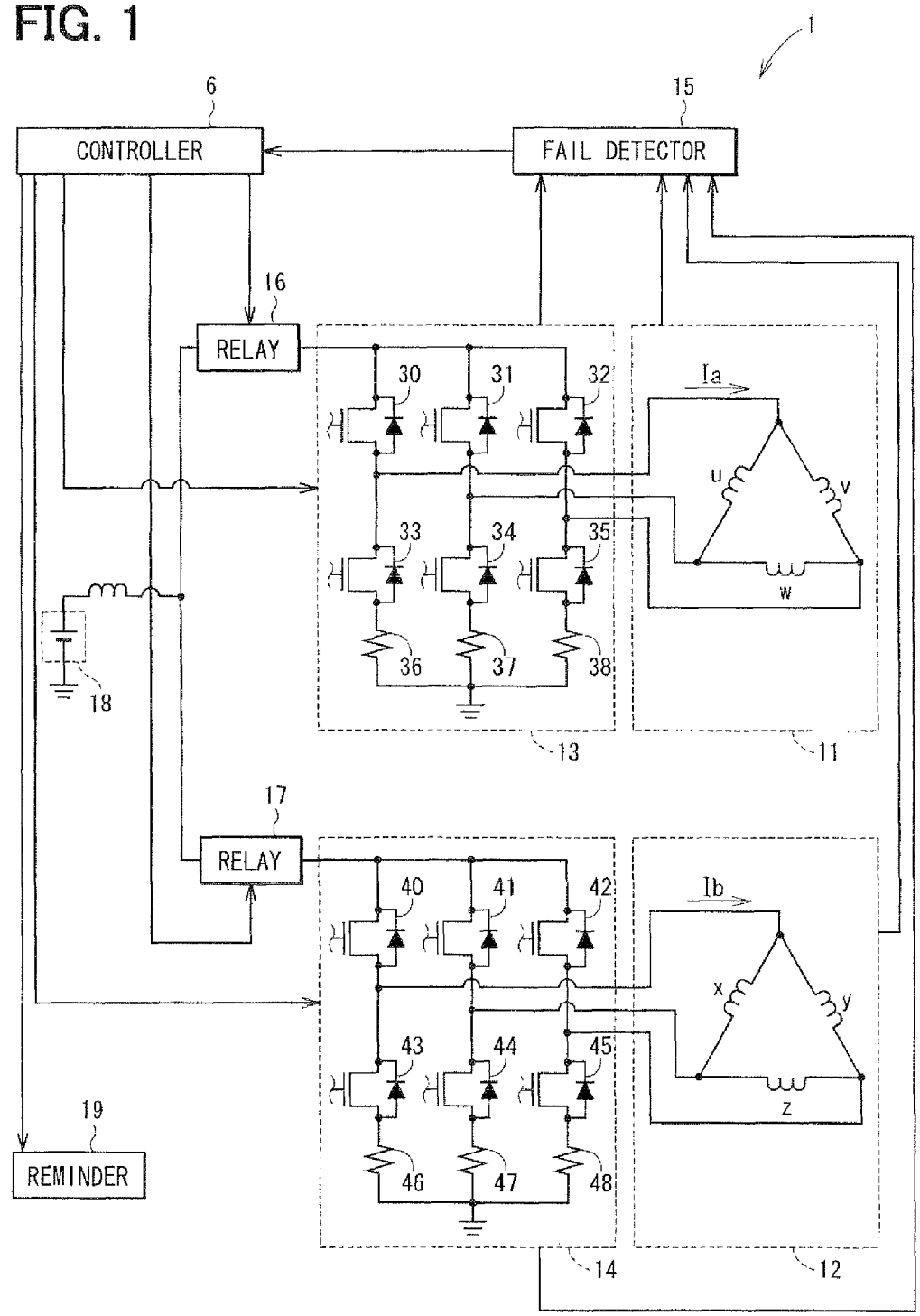
FIG. 1 is a circuit diagram showing an electronic power steering device according to a first embodiment.
Figure 3:
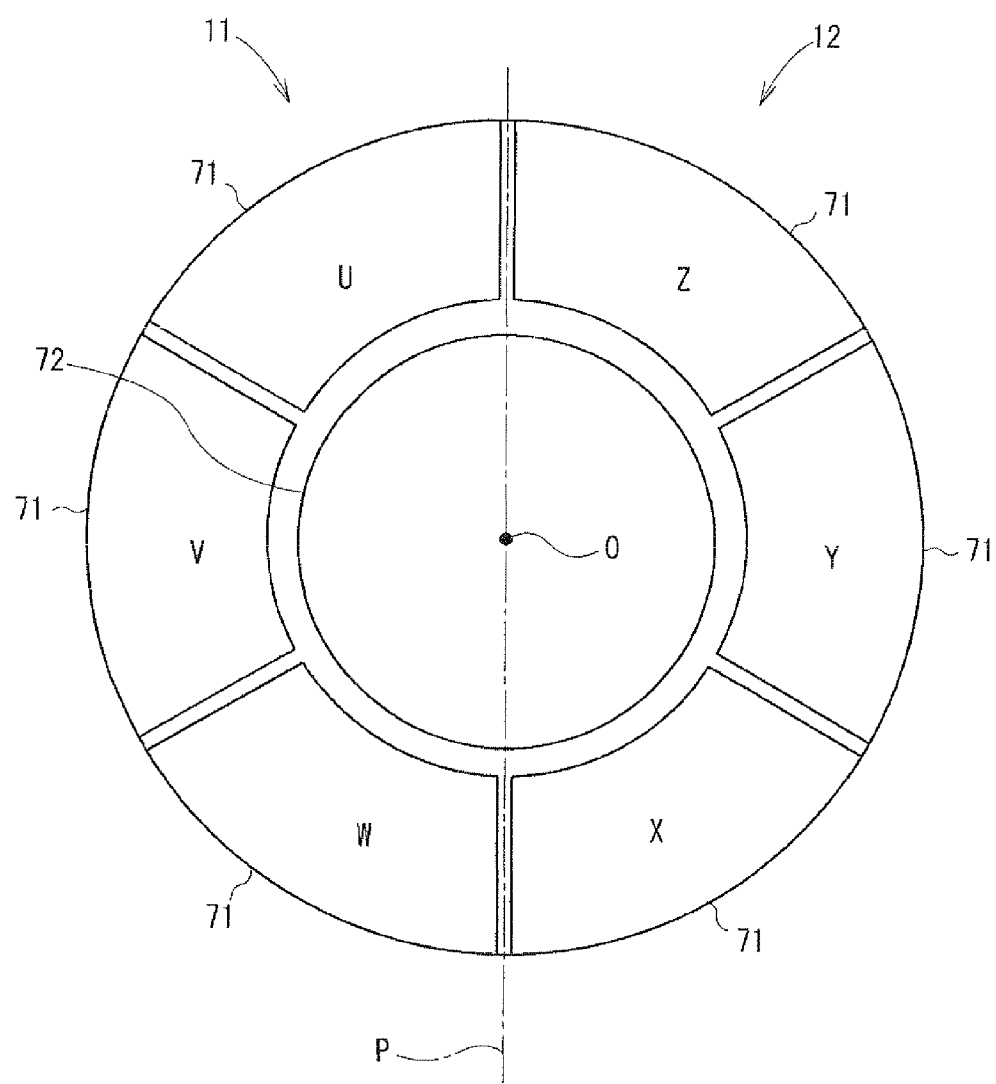
FIG. 3 is a wiring diagram showing an arrangement of windings in a motor of the power steering device.

Next, the circuit construction of the power steering device 1 and the arrangement of the windings will be explained with reference to FIGS. 1 and 3.

The power steering device 1 includes multiple sets of three-phase windings 11, 12 disposed in the motor 7, the controller 6, inverters 13, 14 as an electric power converter, a failure detection device 15, relays 16, 17 as a current breaker and the like.

The motor 7 is a three-phase brushless motor. The motor 7 includes two pairs of the three-phase windings 11, 12, which are winded at a protrusion pole of a fixed element 71.

One pair of the windings 11 includes a U-phase winding, a V-phase winding and a W-phase winding, which are winded with a delta connection. The other pair of the windings 12 includes a X-phase winding, a Y-phase winding and a Z-phase winding, which are winded with a delta connection. Two pairs of the windings 11, 12 are arranged symmetrically to sandwich a virtual plane including a rotation axis O. Further, the U-phase winding and the X-phase winding are simultaneously energized, the V-phase winding and the Y-phase winding are simultaneously energized, and the W-phase winding and the Z-phase winding are simultaneously energized. These windings are arranged symmetrically to sandwich the rotation axis O.

The windings 11, 12 generate rotational magnetic field when the windings 11, 12 are energized. The rotational magnetic field provides a driving force for rotating the rotor 72.

The controller 6 sets a current instruction value for driving the motor 7 according to an assist map stored in the memory based on the rotation angle signal, the steering torque signal and the vehicle speed signal. The controller 6 generates a pulse signal for supplying current to the windings 11, 12 via the inverters 13, 14 with using a PWM circuit (not shown), the current being a half of the current instruction value. Here, the current is made to be a half of the current instruction value since two inverters 13, 14 are arranged to correspond to two windings 11, 12 so that two systems of the driving circuits operate the motor 7. Specifically, the current instruction value to be set by the controller 6 is a sum of current to be supplied to two pairs of the windings 11, 12 via two inverters 13, 14.

Each inverter 13, 14 includes a power MOSFETs 30-35, 40-45 as a semiconductor device, a flywheel diode, Shunt resistors 36-38, 46-48, capacitors and other electric elements.

Each inverter 13, 14 converts the current supplied from the battery 18 as an electric power source into a half of the current instruction value, i.e., current Ia, Ib, when the pulse signal generated by the PWM circuit is applied to the power MOSFETs 30-35, 40-45 as a switching signal. Then, the inverter 13, 14 supplies the converted current Ia, Ib to the corresponding winding 11, 12.

The failure detection device 15 as a failure detection means detects current flowing through the inverter 13, 14 and/or the winding 11, 12 with using the Shunt resistors 36-38, 46-48 so that the device 15 detects failure of the inverter 13, 14 and/or the winding 11, 12. Here, the current detected by the Shunt resistors 36-38, 46-48 is also used for feedback control.

The relay 16, 17 as the current breaker is formed in a connecting path between the battery 18 and the inverter 13, 14. Two relays 16, 17 open the current path so that the current flowing between the failed inverter 13, 14 and the battery 18 is cut off when the failure detection device 15 detects the failure.

The reminder element 19 alerts a driver of the vehicle with using at least one of a warning lamp and a buzzer when the failure detection device 15 detects the failure. The warning lamp turns on, and/or the buzzer outputs a beep sound when the failure detection device 15 detects the failure. The warning lamp and the buzzer are arranged in a combination meter or a navigation display, which is mounted on the vehicle.

Figure 4:
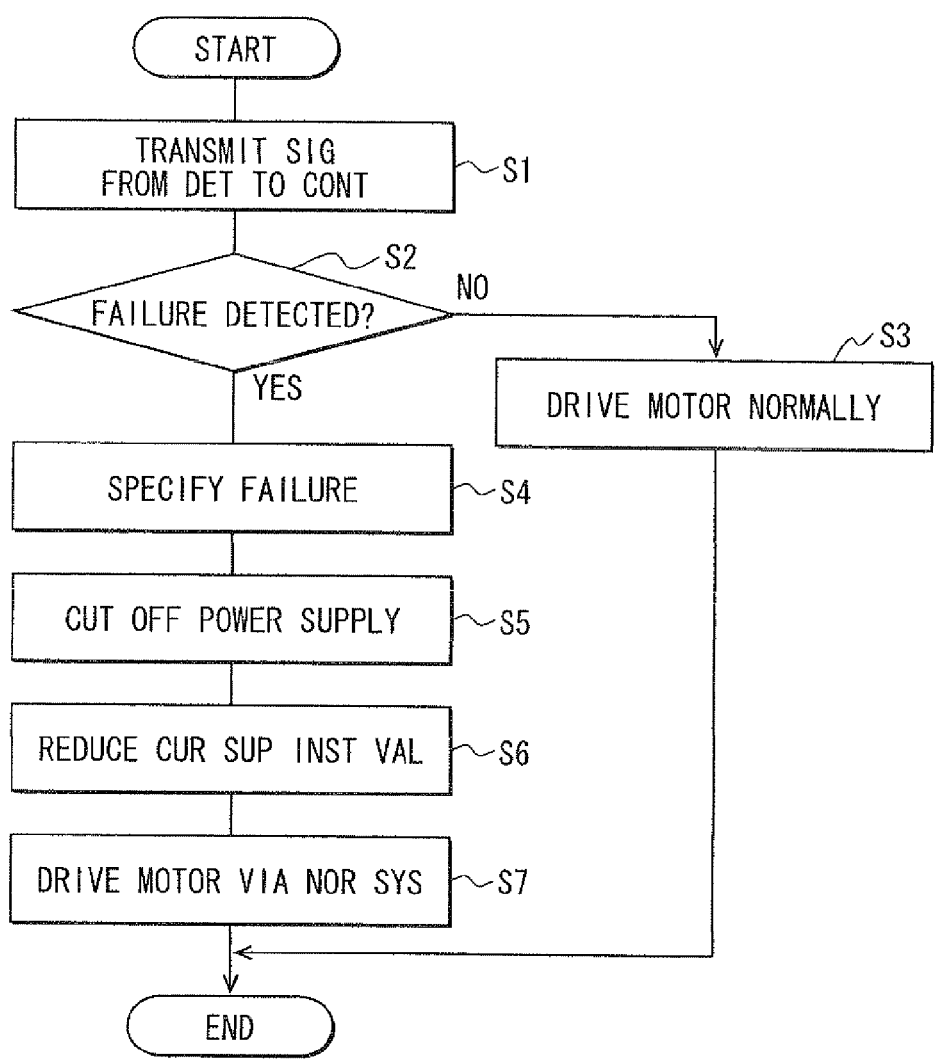
FIG. 4 is a flowchart showing a process of the power steering device when a part of the power steering device is broken.

An operation of the power steering device 1 will be explained with reference to FIG. 4.

When the motor 7 of the power steering device 1 is operated, in step S1, the failure detection device 15 transmits a signal of the current Ia, Ib to the controller 6 flowing through the inverter 13, 14 or the three-phase windings 11, 12.

When the controller 6 does not recognize failure detection of the inverter 13, 14 or the three-phase windings 11, 12 in step S2, i.e., when the determination of step S2 is "NO," the controller 6 normally drives the motor 7 with using two systems of the driving circuits in step S3.

When the controller 6 recognizes the failure detection of the inverter 13, 14 or the three-phase windings 11, 12 in step S2, i.e., when the determination of step S2 is "YES," the controller 6 specifies the failed system and the failed phase in step S4. Further, the controller 6 alerts the driver via the reminder element 19.

Assuming that one of the inverters 13 is failed, explanation will be presented.

The controller 6 controls the relay 16 corresponding to the failed system to opens the current path so that the current supply to the inverter 13 and the winding 11 is stopped in step S5.

Next, in step S6, the controller 6 sets the maximum current setting instruction signal for providing an instruction to the inverter 13, 14 to be equal to the maximum current supply value, which is supplied to the three-phase windings 12 from the normal inverter 14 other than the failed inverter 13 before the failure detection. In this case, since one of the systems is failed, a sum of the current Ia, Ib flowing through the inverters 13, 14 is detected as a half of the current instruction value in the feedback control process. Accordingly, the current flowing through the normal inverter 14 increases in the feedback control process. However, since the controller 63 reduces the maximum current instruction value, the current Ib to be supplied from the inverter 14 to the three-phase winding 12 is set to be equal to or smaller than the maximum current supply value of the normal inverter 14 before the failure detection.

Alternatively, the controller 6 may reduce the current instruction value for providing the instruction to the inverter 13, 14 to be equal to the current supply value, which is supplied by the normal inverter 14 other than the failed inverter 13 to the three-phase windings 12 before the failure detection. The controller 6 determines the driving force to be output from the motor 7 based on the steering torque signal and the vehicle speed signal. The controller 6 calculates the current for providing the driving force to be output from the motor 7. Alternatively, the controller may set the current instruction value to be a half of the calculated current. In the present embodiment, assuming that one of the inverters is failed, the controller 6 sets the current instruction value to be a half of the current, which is necessary to generate the driving force at normal time. If one of three inverters is failed, the controller 6 may set the current instruction value to be two-thirds of the current, which is necessary to generate the driving force at normal time. In this case, the maximum current instruction value as the maximum value of the current instruction value is limited to the maximum current supply value supplied by the normal inverter 14 other than the failed inverter 13 to the three-phase windings 12 before the failure detection.

After that, in step S7, the controller 6 continues to supply the current to the three-phase windings 12 from the normal corresponding inverter 14. Thus, the motor 7 is driven via only a normal system.

Next, an electronic power steering device 20 as a comparison of the present embodiment will be explained with reference to FIGS. 8 and 9.

The power steering device 20 is described in JP-2009-6963, which corresponds to US 2010/0017063.

Figure 8:
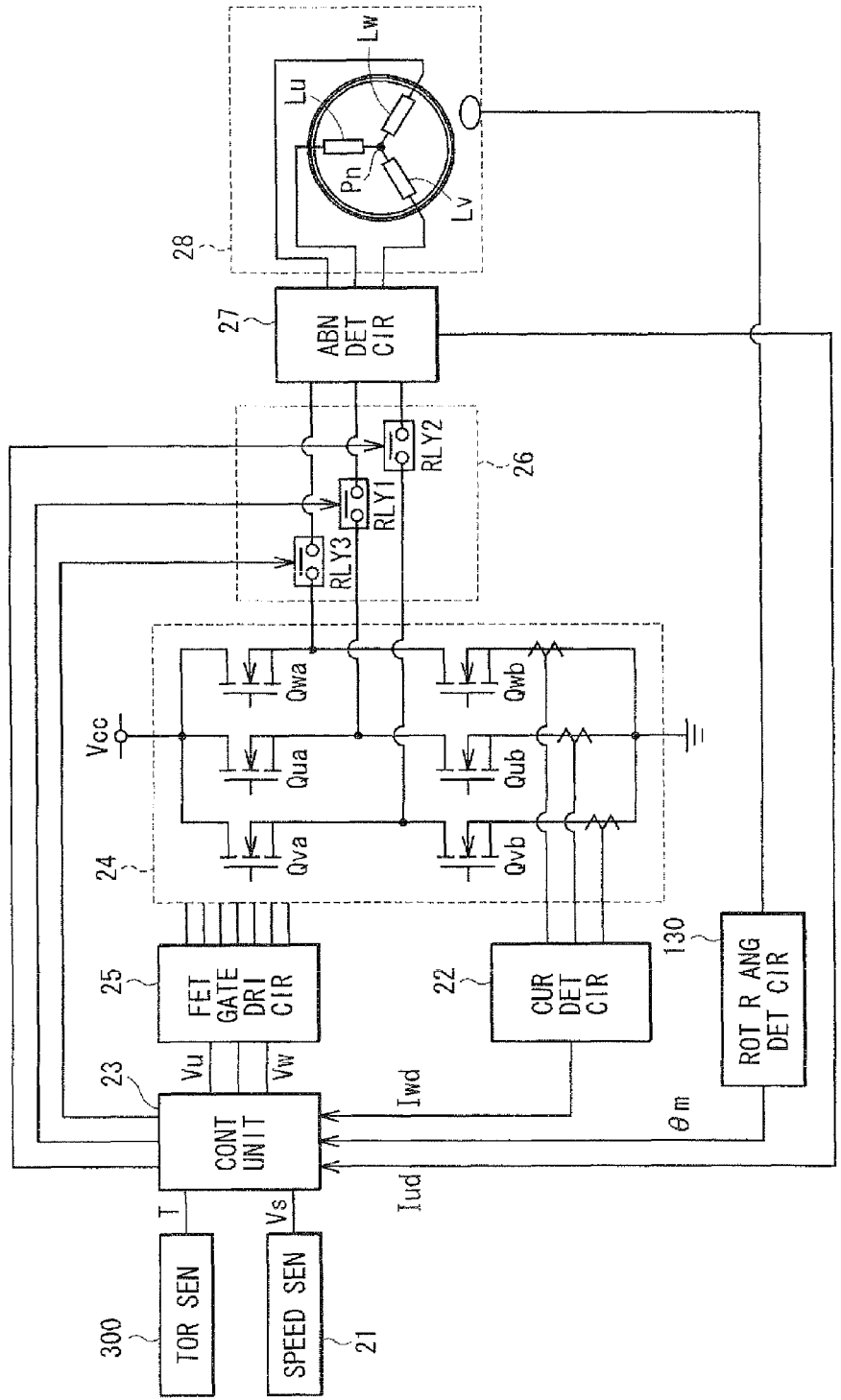
FIG. 8 is a circuit diagram showing an electronic power steering device as a comparison.
Figure 9:
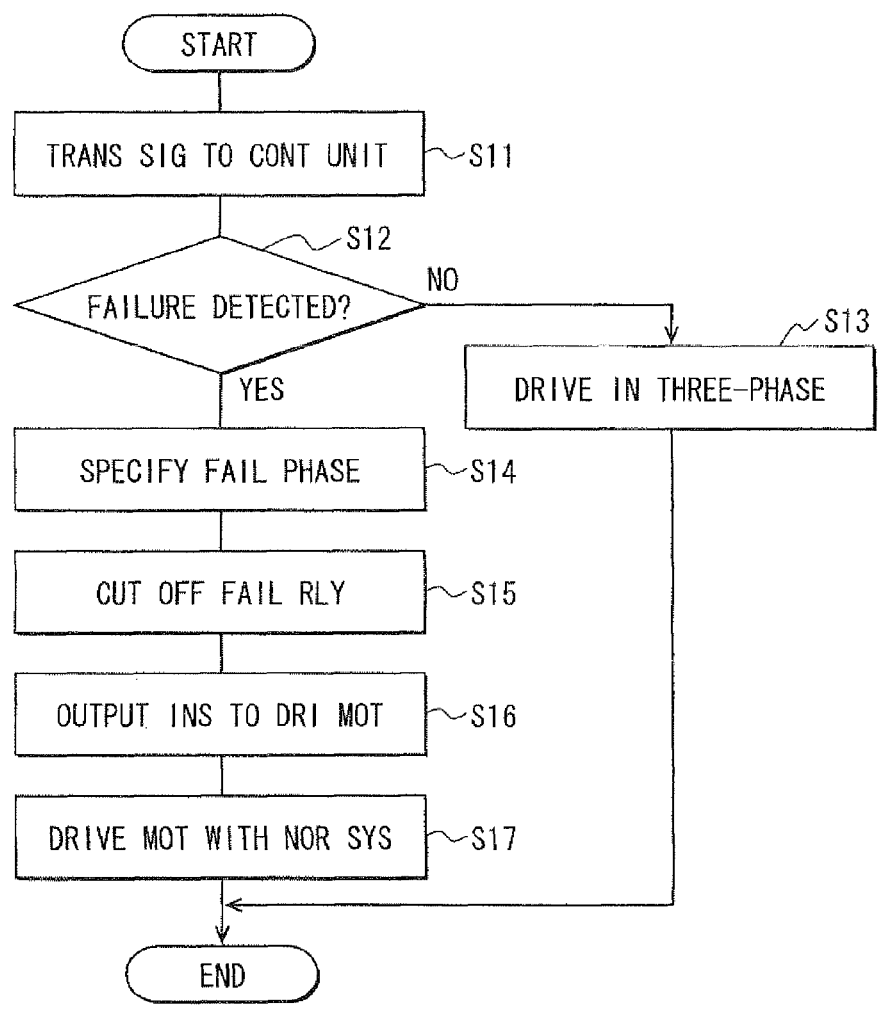
FIG. 9 is a flowchart showing a process of the power steering device as the comparison when a part of the power steering device is broken.

As shown in FIG. 8, the steering device 20 drives an electric motor 28 via one system of a driving circuit. The motor 28 includes one set of three-phase windings Lu, Lv, Lw, which are coupled with each other in a star connection manner. One inverter 24 supplies current to the three-phase windings Lu, Lv, Lw.

A relay RLY1, RLY2, RLY3 cuts off current to be supplied to a corresponding phase winding Lu, Lv, Lw. The relay RLY1, RLY2, RLY3 is disposed in a connection path between a corresponding phase transistor of the inverter 24 and a corresponding phase winding Lu, Lv, Lw. An abnormality detection circuit 27 for detecting failure of each phase is formed between the inverter 24 and each phase winding Lu, Lv, Lw.

The operation of the power steering device 20 in case of failure occurrence will be explained with reference to FIG. 9.

When the motor 28 of the power steering device 20 is operated, the abnormality detection circuit 27 transmits a signal of current flowing through each phase winding Lu, Lv, Lw to the control unit 23 in step S11.

When the control unit 23 does not recognize failure detection of the inverter 24 and/or each phase winding Lu, Lv, Lw, i.e., when the determination of step S12 is "NO," the control unit 23 drives the motor 28 in a three-phase manner in step S13.

When the control unit 23 recognizes failure detection of the inverter 24 and/or each phase winding Lu, Lv, Lw, i.e., when the determination of step S12 is "YES," the control unit 23 specifies a failure phase based on the signal transmitted from the abnormality detection circuit 27 in step S14. Assuming that transistors Qwa, Qwb in a W-phase are failed, the following explanation is presented.

The control unit 23 outputs an instruction for stopping current to the relay RLY3, which corresponds to the W-phase. Thus, the current to be supplied to the transistors Qwa, Qwb in the W-phase and the W-phase winding Lw is stopped in step S15.

Next, the control unit 23 outputs an instruction for energizing to the FET gate driving circuit 25 in step S16 so that the motor 285 is driven with a normal U-phase system and a normal V-phase system. The FET gate driving circuit 25 as a PWM circuit outputs a pulse signal based on the instruction for energizing, and therefore, the motor 28 is driven with the two normal systems in step S17.

In the comparison, one relay RLY1, RLY2, RLY3 is formed in each phase. When an electronic power steering device drives a motor with multiple systems of driving circuits, and the number of the systems is defined as N, the number of relays is calculated by multiplying N by three. Accordingly, the number of parts increases, and a manufacturing cost increases.

Further, in the comparison, when one phase system is failed, the motor is driven with other two normal phase systems. Accordingly, an electro-magnetic attractive force between a stator and a rotor of the motor is inhomogeneous. Thus, the motor 28 may vibrate. The vibration may transmit a steering wheel, which is operated by the driver of the vehicle. Thus, the driver may feel anxiety.

Further, in general, the control unit includes a protection function for reducing current to be supplied from a battery when temperature of a transistor and/or an electric element in an inverter is high. In the comparison, the motor is driven with two phase systems when the failure occurs. Accordingly, since temperature of transistors Qua, Qub, Quc and the electric element in the inverter rapidly increases for a short time, the operation of the protection function starts quickly. Accordingly, the reduction of the driving force of the motor 28 starts quickly, and therefore, the operation of the steering wheel driven by the steering force of the driver himself increases.

In the present embodiment, each relay 16, 17 is formed in a connection path between the battery 18 and a corresponding inverter 13, 14. Thus, without adding relays and their circuits, one relay stops supplying current to the failed system. Thus, the manufacturing cost is reduced.

Further, in the present embodiment, the controller 6 controls the relay 16 to stop supplying current to the inverter 13 and the three-phase windings 11 in the failed system. The controller 6 controls the normal inverter 14 and the three-phase windings 12 to drive the motor 7 continuously. Each phase winding in the three-phase windings 12 in the normal system is arranged uniformly on one side of the virtual plane P. Thus, the electro-magnetic attractive force generated between the stator 71 and the rotor 72 is stabilized. Accordingly, the vibration of the motor 7 in case of failure is restricted. Thus, the vibration is not transmitted to the steering wheel 2, which is operated by the driver, and therefore, the driver operates the steering wheel smoothly and continuously. Specifically, the driver does not feel strangeness of operation of the steering wheel.

Further, the controller 6 sets the maximum current instruction value for controlling multiple inverters 13, 14 to be equal to the maximum current supply value, which is supplied from the normal inverter 14 other than the failed inverter 13 to the three-phase windings 12 before the failure detection. Accordingly, the temperature increase of the power MOSFETs 40-45 and the electronic elements in the inverter 14 is restricted. The starting time of the operation of the protection function is delayed. Accordingly, the switching time of the operation of the steering wheel from a case where the driver operates the steering wheel comparatively small force to a case where the driver operates the steering wheel comparatively large force is delayed. Thus, the driver drives the vehicle safety until the vehicle reaches a place such as an automobile dealer, at which the vehicle is repaired.

Here, the advantage of the steering device having multiple systems of driving circuits for driving the motor is to reduce required specifications of the heat resistance performance of the power MOSFET and the electronic element in the inverter. For example, in the power steering device having multiple inverters, when the number of the inverters is defined as N, the current flowing through one inverter can be set to be one-N-th in a case where the torque of the steering device is equal to that of a steering device having one inverter.

However, as described in JP-A-2005-304119, when the current to be supplied to the three-phase windings from the inverter in case of failure is doubled, it is necessary to increase the required specifications of the heat resistance performance of the power MOSFET and the electronic element in the inverter. In this case, the manufacturing cost of the semiconductor devices and the electronic elements in the inverter increases although the manufacturing cost is reduced by forming multiple systems of the driving circuits for the motor.

Further, when the current to be supplied to the three-phase windings from the inverter in case of failure is doubled, the driving force of the motor after failure is equalized to that before failure. Thus, the driver may not be aware of the failure of the power steering device. In this case, the driver drives the vehicle without repairing the steering device.

However, in the present embodiment, since the controller 6 limits the maximum current instruction value, the maximum current supply value from the normal inverter 14 to corresponding three-phase windings 12 in case of failure is substantially equal to the maximum current supply value before failure detection. Thus, the energization continues without changing the maximum current supply value. Accordingly, the temperature increase of the power MOSFETs 30-35, 40-45 and the electronic elements in the inverters 13, 14 is restricted. Thus, the required specifications of the heat resistance performance of the power MOSFETs 30-35, 40-45 and the electronic elements are reduced, and therefore, the manufacturing cost is reduced.

Further, the controller 6 controls the reminder element 19 to alert the driver of the vehicle in an acoustic manner or a visible manner when the steering device is failed. Further, the controller 6 reduces the current instruction vale. Accordingly, even if the driver is a hearing impaired person so that the driver is not aware of the alert of the reminder element 19 in the acoustic manner or the visible manner, since the driving force of the motor 7 is reduced in a case where the current instruction value is reduced, the steering force of the steering wheel by the steering device is clearly changed, and therefore, the driver can be aware of the failure of the steering device. Accordingly, the steering device 1 supports the driver safety and continuously by assisting the driving force of the steering wheel.

Second Embodiment

Figure 5:
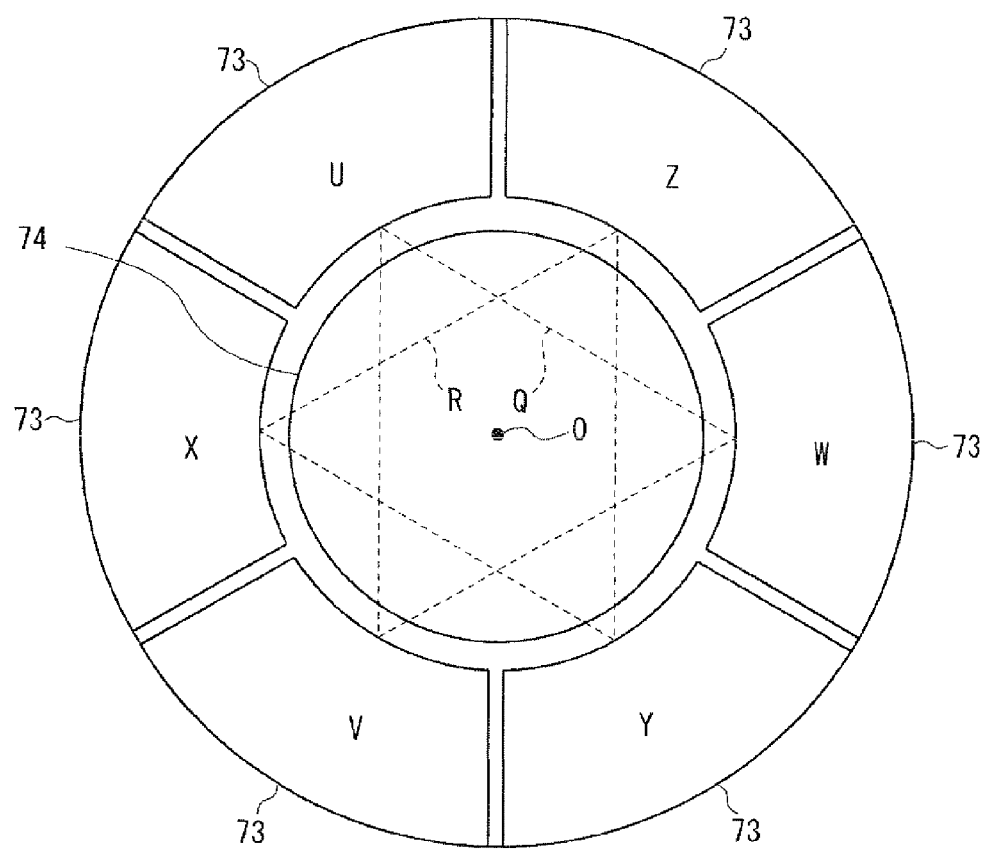
FIG. 5 is a wiring diagram showing an arrangement of windings in a motor of a power steering device according to a second embodiment.

The arrangement of the windings of the motor in the power steering device according to a second embodiment is shown in FIG. 5. Each phase winding is winded around a protrusion pole of the stator 73 in such a manner that the mechanical phase difference is the same in a circumferential direction. Specifically, shown as a dotted line Q in FIG. 5, a U-phase winding, a V-phase winding and a W-phase winding in one driving system have the mechanical phase difference of 120 degrees. Further, shown as another dotted line R, a X-phase winding, a Y-phase winding and a Z-phase winding in the other driving system have the mechanical phase difference of 120 degrees.

In the present embodiment, if the inverter and/or the three-phase windings in one system is failed, and the other system drives the motor, the electro-magnetic attractive force between the stator 73 and the rotor 41 is uniformed in the rotating direction of the rotor 74. Thus, the vibration of the motor is reduced. Accordingly, the steering device can assist the steering force of the driver smoothly.

Third Embodiment

Figure 6:
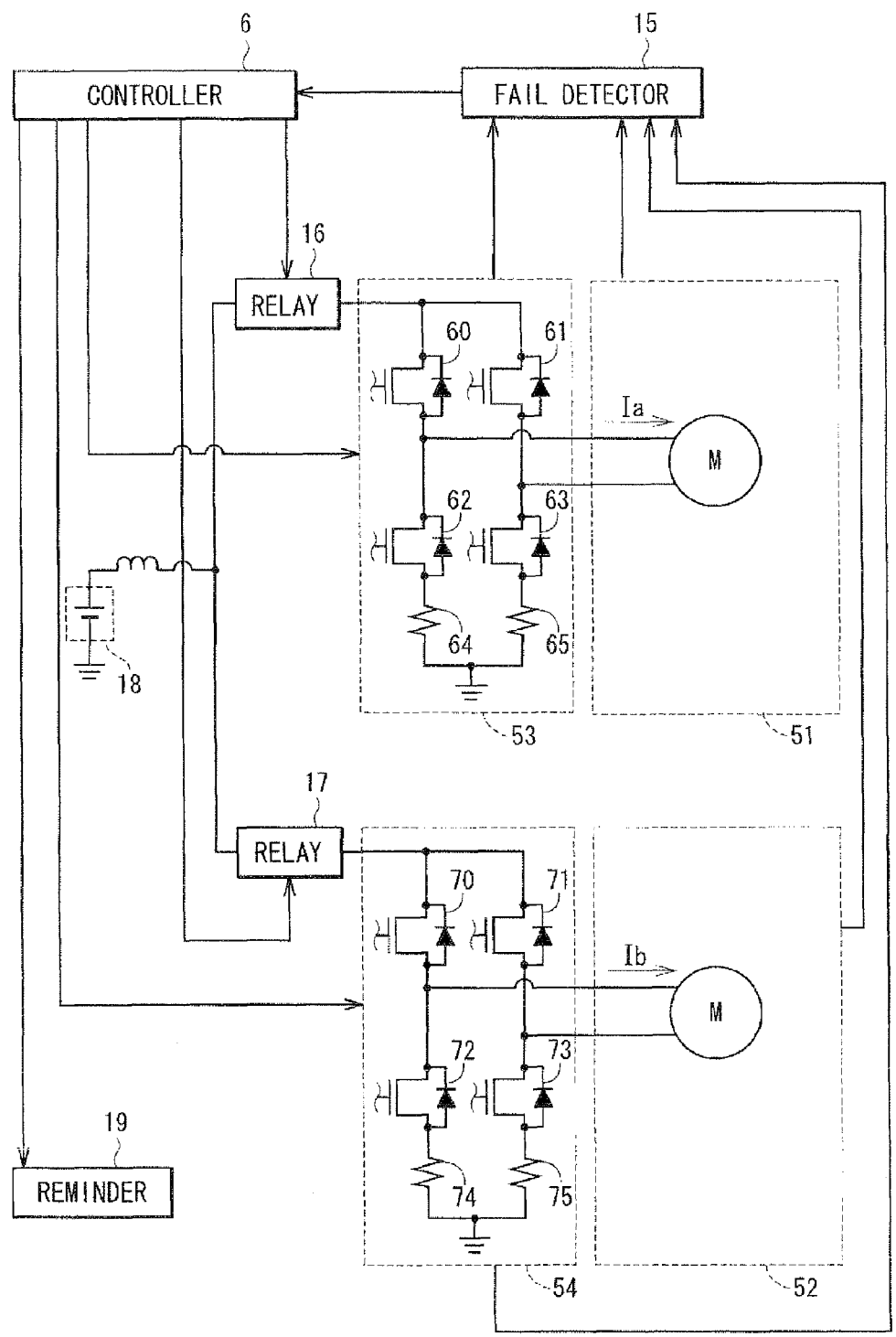
FIG. 6 is a circuit diagram showing an electronic power steering device according to a third embodiment.

An electronic power steering device according to a third embodiment is shown in FIG. 6.

The motor in the device in FIG. 6 is a brush motor. The brush motor includes two pairs of the windings 51, 52 in the rotor. Current Ia, Ib is supplied from one H-bridge circuit 53, 54 as an electric power converter to a corresponding windings 51, 52.

Here, two pairs of the windings 51, 52 are arranged symmetrically to a virtual plane including the rotation axis of the rotor. Alternatively, each phase winding in the windings 51, 52 may be arranged such that the mechanical phase difference is the same in the circumferential direction.

Figure 7:
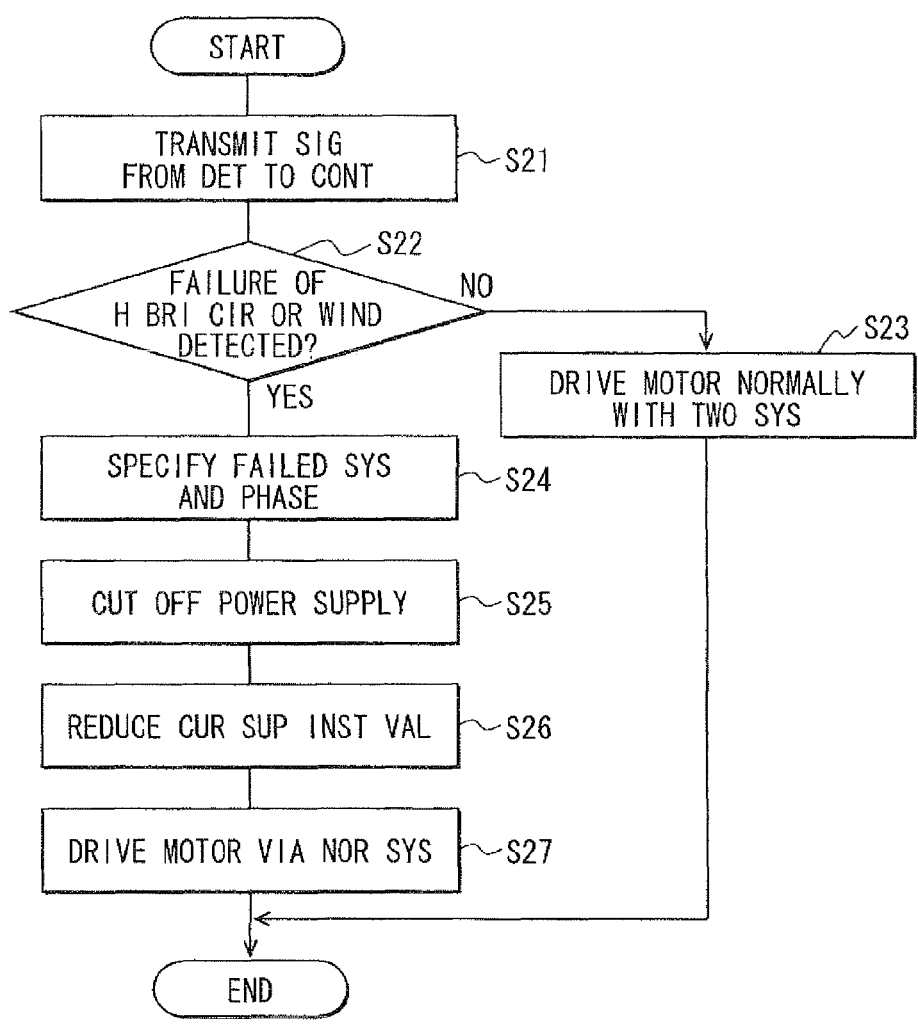
FIG. 7 is a flowchart showing a process of the power steering device according to the third embodiment when a part of the power steering device is broken.

The operation of the steering device in the present embodiment in case of failure is shown in FIG. 7. The operation in FIG. 7 is substantially similar to the first embodiment.

In the present embodiment, the temperature increase of the switching elements 60-63, 70-73 in the H-bridge circuits 53, 54 and the electric elements is restricted, and therefore, the starting time of the operation of the protection function is delayed. Thus, the switching time of the operation of the steering wheel from a case where the driver operates the steering wheel comparatively small force to a case where the driver operates the steering wheel comparatively large force is delayed.

Further, the maximum current supply value supplied from the normal H-bridge circuit 54 to the corresponding windings 52 in case of failure is substantially the same as the maximum current supply value before the failure detection. Thus, the energization continues smoothly. Thus, the required specifications of the heat resistance performance of the switching elements 60-63, 70-73 and the electric elements in the H-bridge circuits 53, 54 are reduced. Further, the motor is driven by multiple systems of the driving circuits. Accordingly, the manufacturing cost is much reduced.

When one system is failed, the current instruction value of the controller 6 is reduced. Thus, the driving force of the motor is also reduced. Thus, the steering force assisted by the device is clearly reduced. Accordingly, the driver of the vehicle is aware of the failure of the steering device. Thus, even if the H-bridge circuits 53, 54 and/or the windings 51, 52 are failed, the power steering device can assists the steering force of the driver safety and continuously.

Other Embodiments

In the above embodiments, the controller 6 reduces the current instruction value when the controller 6 detects the failure. Alternatively, the controller 6 may reduces the voltage instruction value when the controller 6 detects the failure. In this case, the electric power converter converts the electric power to be supplied from an electric power source into the voltage based on the voltage instruction value. Then, the converted voltage is applied to the windings of the motor.

The above disclosure has the following aspects.

According to an aspect of the present disclosure, an electric power steering device for assisting a steering force of a driver of a vehicle with a driving force of a motor includes: an electric power source for supplying first current; a controller for setting a current instruction value, which provides the driving force of the motor; a plurality of electric power converters for converting the first current from the electric power source to second current corresponding to the current instruction value; a plurality of pairs of windings, each of which correspond to a respective electric power converter, and generates the driving force of the motor when the second current is supplied from the electric power converter to the winding; and a failure detection element for detecting the first current flowing through the electric power converters and the second current flowing through the windings, and for detecting failure of the electric power converters and the windings. The controller reduces the current instruction value to be equal to or smaller than a predetermined instruction value of a normal operation when the failure detection element detects the failure. The controller controls the electric power converter in a normal state to supply the second current to a corresponding winding in the normal state.

Since the second current to be supplied from the electric power converter to the corresponding winding is reduced when the failure detection element detects the failure of the electric power converter or the winding, the driving force of the motor is reduced. Accordingly, the steering force of the driver is changed, so that the driver is aware of occurrence of the failure. Thus, the steering device can assist the steering force of the driver safety and continuously even if the electric power converter or the winding is failed.

Alternatively, the current instruction value may include a maximum current instruction value. The second current of the electric power converter in the normal state includes a maximum second current, which is supplied to a corresponding winding before failure detection, and the controller sets the maximum current instruction value to be equal to the maximum second current. In this case, the maximum second current to be supplied to the winding in the normal state after occurrence of failure is substantially equal to the maximum second current before occurrence of failure. Accordingly, temperature increase of a semiconductor element and an electric element mounted on the electric power converter is restricted. Thus, a required specification of heat resistance performance in the semiconductor element and the electric element is made small. Thus, the manufacturing cost of the steering device is improved.

Alternatively, the current instruction value may include a maximum current instruction value. The second current of the electric power converter in the normal state includes a maximum second current, which is supplied to a corresponding winding before failure detection. Each electric power converter includes a semiconductor element and an electric element, which have a required specification of a current supply value of heat resistance performance. The controller sets the maximum current instruction value to be equal to or smaller than the required specification of the current supply value in the electric power converter in the normal state, and equal to or larger than the maximum second current. In this case, the starting time of the operation of a protection function is delayed. Accordingly, the switching time of the operation of the steering wheel from a case where the driver operates the steering wheel comparatively small force to a case where the driver operates the steering wheel comparatively large force is delayed.

Alternatively, when the failure detection element detects the failure, the controller may reduce the current instruction value to be equal to the second current, which is supplied from the electric power converter in the normal state to the corresponding winding before failure detection. In this case, the driving force of the motor is reduced, and the driver is aware of the failure of the steering device.

Alternatively, the electric power steering device may further include: a plurality of current breakers, each of which is disposed between the electric power source and a corresponding electric power converter. When the failure detection element detects the failure, one of the current breakers cuts off the first current flowing between the electric power source and a corresponding electric power converter, which is in a failure state. In this case, the number of the current breakers is the same as the number of the electric power converter. Thus, the manufacturing cost is reduced.

Alternatively, the electric power steering device may further include: a reminder element for alerting the driver with at least one of a warning lamp and a buzzer when the failure detection device detects the failure. The warning lamp and the buzzer are arranged in a combination meter or a navigation system. In this case, the driver is aware of the failure in an acoustic manner or a visible manner.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An electric power steering device for assisting a steering force of a driver of a vehicle with a driving force of a motor comprising:
   an electric power source for supplying first current;
   a controller for setting a current instruction value, which provides the driving force of the motor;
   a plurality of electric power converters for converting the first current from the electric power source to second current corresponding to the current instruction value;
   a plurality of pairs of windings, each of which correspond to a respective electric power converter, and generates the driving force of the motor when the second current is supplied from the electric power converter to the winding; and
   a failure detection element for detecting the first current flowing through the electric power converters and the second current flowing through the windings, and for detecting failure of the electric power converters and the windings, wherein the controller reduces the current instruction value to be equal to or smaller than a predetermined instruction value of a normal operation when the failure detection element detects the failure, and wherein, when the failure detection element detects the failure, the controller controls the electric power converter in a normal state based on a reduced current instruction value to supply the second current to a corresponding winding in the normal state.

2. The electric power steering device according to claim 1, wherein the current instruction value includes a maximum current instruction value, wherein the second current of the electric power converter in the normal state includes a maximum second current, which is supplied to a corresponding winding before failure detection, and wherein the controller sets the maximum current instruction value to be equal to the maximum second current.

3. The electric power steering device according to claim 1, wherein the current instruction value includes a maximum current instruction value, wherein the second current of the electric power converter in the normal state includes a maximum second current, which is supplied to a corresponding winding before failure detection, wherein each electric power converter includes a semiconductor element and an electric element, which have a required specification of a current supply value of heat resistance performance, and wherein the controller sets the maximum current instruction value to be equal to or smaller than the required specification of the current supply value in the electric power converter in the normal state, and equal to or larger than the maximum second current.

4. The electric power steering device according to claim 1, wherein, when the failure detection element detects the failure, the controller reduces the current instruction value to be equal to the second current, which is supplied from the electric power converter in the normal state to the corresponding winding before failure detection.

5. The electric power steering device according to claim 1, further comprising:

a plurality of current breakers, each of which is disposed between the electric power source and a corresponding electric power converter, wherein, when the failure detection element detects the failure, one of the current breakers cuts off the first current flowing between the electric power source and a corresponding electric power converter, which is in a failure state.

6. The electric power steering device according to claim 1, further comprising:

a reminder element for alerting the driver with at least one of a warning lamp and a buzzer when the failure detection device detects the failure, and wherein the warning lamp and the buzzer are arranged in a combination meter or a navigation system.

7. The electric power steering device according to claim 1, wherein, when the failure detection element does not detect the failure, the second current is supplied from each of all of the electric power converters to a respective winding; and wherein, when the failure detection element detects the failure, the controller reduces the current instruction value to be equal to the second current, which is supplied from the electric power converter in the normal state to the corresponding winding before failure detection.

* * * * *